US010075468B2

(12) United States Patent
Kish et al.

(10) Patent No.: US 10,075,468 B2
(45) Date of Patent: Sep. 11, 2018

(54) DENIAL-OF-SERVICE (DOS) MITIGATION APPROACH BASED ON CONNECTION CHARACTERISTICS

(71) Applicant: Fortinet, Inc., Sunnyvale, CA (US)

(72) Inventors: William A. Kish, Millerton, NY (US); Sergey Katsev, Pleasant Valley, NY (US)

(73) Assignee: Fortinet, Inc., Sunnyvale, CA (US)

( * ) Notice: Subject to any disclaimer, the term of this patent is extended or adjusted under 35 U.S.C. 154(b) by 169 days.

(21) Appl. No.: 15/192,604

(22) Filed: Jun. 24, 2016

(65) Prior Publication Data
US 2017/0374098 A1   Dec. 28, 2017

(51) Int. Cl.
*H04L 29/06* (2006.01)
*H04L 12/26* (2006.01)
*H04L 29/08* (2006.01)

(52) U.S. Cl.
CPC ...... *H04L 63/1458* (2013.01); *H04L 43/0876* (2013.01); *H04L 43/16* (2013.01); *H04L 67/02* (2013.01); *H04L 2463/142* (2013.01)

(58) Field of Classification Search
None
See application file for complete search history.

(56) References Cited

U.S. PATENT DOCUMENTS

| | | | | |
|---|---|---|---|---|
| 6,222,856 B1 * | 4/2001 | Krishnan | ............... | H04L 47/10 370/464 |
| 9,154,423 B1 * | 10/2015 | Szabo | ................... | H04W 28/02 |
| 9,838,410 B2 * | 12/2017 | Muddu | ............... | H04L 63/1425 |
| 2002/0035628 A1 * | 3/2002 | Gil | ......................... | H04L 43/00 709/224 |
| 2004/0093512 A1 * | 5/2004 | Sample | ............... | G06F 11/3495 726/23 |
| 2007/0006313 A1 * | 1/2007 | Porras | ................... | G06F 21/566 726/24 |
| 2008/0077995 A1 * | 3/2008 | Curnyn | .............. | H04L 63/1416 726/27 |
| 2009/0007266 A1 * | 1/2009 | Wu | ...................... | H04L 63/1425 726/22 |
| 2010/0192201 A1 * | 7/2010 | Shimoni | ................ | G06F 21/55 726/3 |

(Continued)

*Primary Examiner* — Benjamin E Lanier
(74) *Attorney, Agent, or Firm* — Hamilton, DeSanctis & Cha LLP

(57) ABSTRACT

Systems and methods for an improved DDoS mitigation approach are provided. According to one embodiment, a current threshold for a network connection characteristic is established within a Denial-of-Service (DoS) mitigation device logically interposed between a protected resource of a private network and multiple client devices residing external to the private network. A number of connections between the client devices and the protected network resource are tracked. During a period of time in which the number of connections exceeds a connection count threshold: (i) for each of the connections, a measured value for the network connection characteristic is compared to the current threshold; (ii) responsive to a determination that the measured value exceeds the current threshold, the connection is dropped; and (iii) the current threshold is periodically reduced, such that only those connections complying with the current threshold are maintained.

16 Claims, 9 Drawing Sheets

(56) References Cited

U.S. PATENT DOCUMENTS

| | | | | |
|---|---|---|---|---|
| 2012/0117254 A1* | 5/2012 | Ehrlich | ................ | H04L 41/142 |
| | | | | 709/228 |
| 2015/0149610 A1* | 5/2015 | Jhanb | ..................... | H04L 67/22 |
| | | | | 709/224 |
| 2016/0080402 A1* | 3/2016 | Smith | ................ | H04L 63/1416 |
| | | | | 726/23 |
| 2016/0337397 A1* | 11/2016 | Li | ....................... | H04L 63/1458 |
| 2017/0257388 A1* | 9/2017 | Addepalli | ........... | H04L 63/1425 |

\* cited by examiner

DENIAL-OF-SERVICE (DOS) MITIGATION APPROACH BASED ON CONNECTION CHARACTERISTICS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2016, Fortinet, Inc.

BACKGROUND

Field

Embodiments of the present invention generally relate to mitigation of Denial-of-Service (DoS) attacks. More particularly, embodiments of the present invention relate to mitigation of DoS attacks by requiring clients to operate within certain predetermined or dynamically determined constraints in terms of timing and/or use of memory or computational resources of a protected network resource.

Description of the Related Art

A typical Denial-of-Service (DoS) attack or Distributed DoS (DDoS) attack is an attempt to make one or more machines or network resources (e.g., services of a host connected to the Internet) unavailable to their legitimate users. Although the means to carry out, the motives for, and the targets of a DoS or DDoS attack may vary, the attack generally consists of efforts to temporarily or indefinitely interrupt or suspend services provided by the targeted machine(s) or network resources.

Most common DoS attacks aim at exhausting resources, such as bandwidth, available sessions, available connections, memory and/or central processing unit (CPU) resources, of the target by, for example, flooding a target network node/resource with valid and/or invalid requests and/or messages. A typical DDoS attack is initiated by one or more people or zombies/bots so as to burden the targeted device, for example, a web or application server, with numerous dummy requests. A DDoS attack is basically a DoS attack that, instead of using a single computer as a base of attack, uses multiple compromised computers simultaneously, possibly a large or a very large number of them, thus amplifying the effect, so as to exhaust the resources of the targeted device or network ultimately resulting in the inability of the target to service legitimate users.

Existing DDoS attack detection and prevention systems, also referred to as DDoS mitigation systems, work as in-line filters between client devices and one or more protected network resources. These DDoS mitigation systems monitor the traffic between the client devices (which may be attackers, zombies or legitimate client devices) and the protected network resource and block traffic directed to the protected network resource when one or more predefined or dynamically calculated adaptive network traffic characteristic thresholds are exceeded. This approach is both suboptimal in terms of utilization of the protected network resource and too coarse. In many cases, the existence of a particular threshold does not necessarily mean that the protected network resource would not be able to handle traffic that slightly exceeds the threshold; however, because certain attack types make it difficult to distinguish between legitimate clients and malicious clients, traffic associated with legitimate clients is dropped in addition to traffic originated by malicious clients.

Therefore, there exists a need for a DoS mitigation approach with improved ability to identify legitimate clients.

SUMMARY

Systems and methods are described for a DoS mitigation approach that seeks to lessen the impact on legitimate clients by distinguishing between legitimate and malicious clients based on connection characteristics/patterns. According to one embodiment, a current threshold for a network connection characteristic is established within a Denial-of-Service (DoS) mitigation device logically interposed between a protected resource of a private network ("protected network resource") and multiple client devices residing external to the private network. A number of connections between the client devices and the protected network resource are tracked by the DoS mitigation device. During a period of time in which the number of connections exceeds a connection count threshold: (i) for each of the connections, a measured value for the network connection characteristic is compared by the DoS mitigation device to the current threshold; (ii) responsive to a determination that the measured value exceeds the current threshold, the connection is dropped by the DoS mitigation device; and (iii) the current threshold is periodically reduced by the DoS mitigation device by a predetermined amount, whereby, during the period of time, only those connections, if any, of the connections complying with the current threshold are maintained by the DoS mitigation device.

Other features of embodiments of the present invention will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
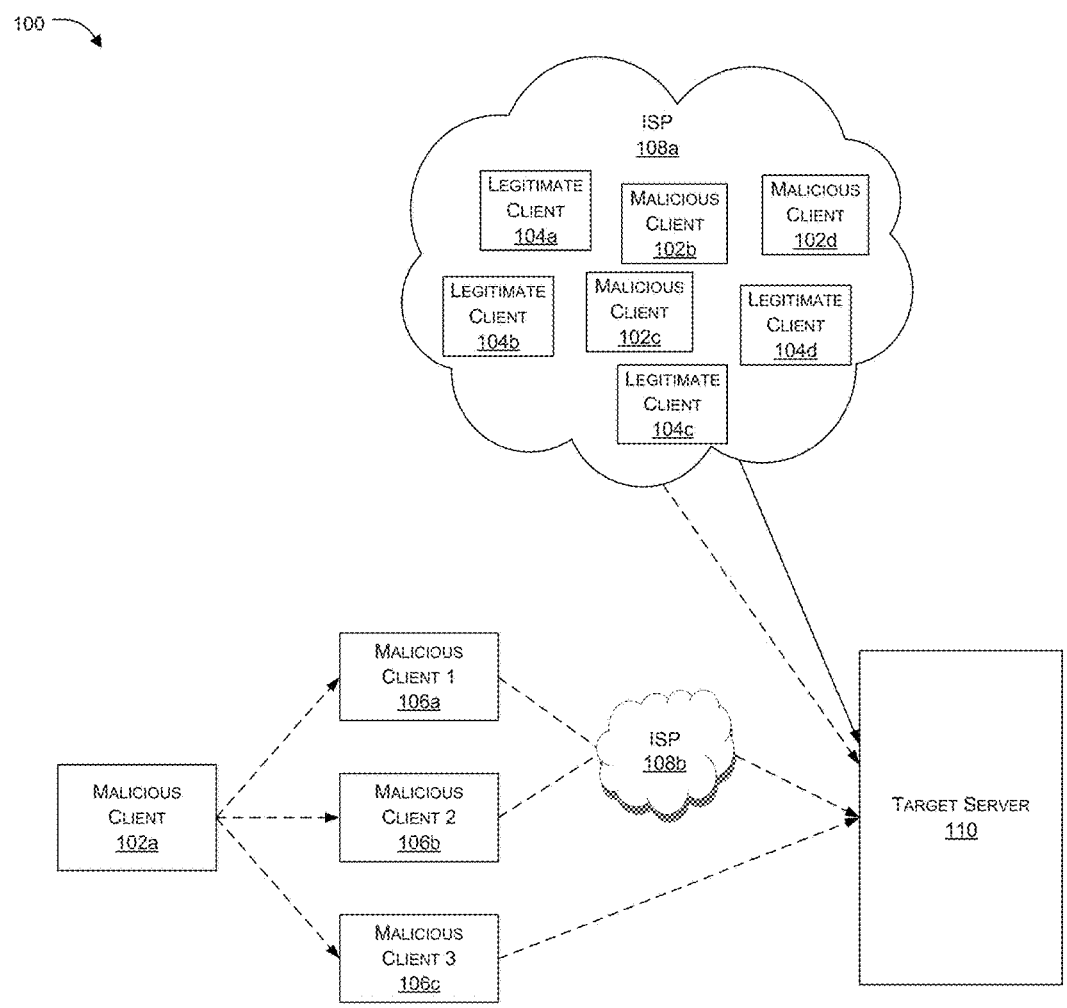
FIG. 1 illustrates an exemplary DDoS network attack on a server.

Systems and methods are described for a DDoS mitigation approach that seeks to lessen the impact on legitimate clients by distinguishing between legitimate and malicious clients based on connection characteristics/patterns. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the invention in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named Systems and methods are described for a DoS mitigation approach that seeks to lessen the impact on legitimate clients by distinguishing between legitimate and malicious clients based on connection characteristics/patterns. An embodiment of the present disclosure provides systems and method for DoS mitigation enabling legitimate clients to access a protected network resource while blocking non-legitimate clients based on connection characteristics and resource consumption patterns.

In an aspect, the present disclosure relates to a method having the steps of establishing, within a DoS mitigation device logically interposed between a resource of a private network (hereafter a "protected network resource" or simply a "network resource") and multiple client devices residing external to the private network, a current threshold for a network connection characteristic; tracking, by the DoS mitigation device, a number of connections between the client devices and the network resource. The method can further include, during a period of time in which the number of connections exceeds a connection count threshold: comparing, by the DoS mitigation device, for each connection, a measured value for the network connection characteristic to the current threshold; and responsive to a determination that the measured value exceeds the current threshold, dropping, by the DoS mitigation device, the connection; and periodically reducing, by the DoS mitigation device, the current threshold by a predetermined amount, whereby, during the period of time, only those connections, if any, complying with the current threshold are maintained.

In an aspect, the network connection characteristic can include a time period between transmission, by the DDoS mitigation device, of a Transmission Control Protocol (TCP) SYN/ACK packet and receipt, by the DDoS mitigation device, of a TCP ACK packet corresponding to the TCP SYN/ACK packet. In another aspect, the network connection characteristic can include a time period between transmission, by the DDoS mitigation device, of a TCP SYN/ACK packet for a connection and receipt, by the DDoS mitigation device, of a first data packet for the connection. In yet another aspect, the DoS mitigation device can include a DoS mitigation module within an Application Delivery Controller (ADC). In another aspect, the network connection characteristic can include a rate of Hypertext Transfer Protocol (HTTP) headers received by the DDoS mitigation device within one or more HTTP requests. In another aspect, the network connection characteristic can include a rate of HTTP POST body data received by the DDoS mitigation device within one or more HTTP requests. The network connection characteristic can further include a rate of HTTP GET data received by the DDoS mitigation device within one or more HTTP requests.

In an aspect, the DoS mitigation device can include a standalone DoS mitigation device, wherein the method can further include the step of, responsive to the determination that the measured value exceeds the current threshold, transmitting, by the standalone DoS mitigation device, a TCP RST packet to the network resource.

Aspects of the present disclosure further relate to a method having the steps of establishing, within a DoS mitigation device logically interposed between a protected network resource within a private network and multiple client devices residing external to the private network, a resource consumption threshold; tracking, for each client device associated with a connection, by the DoS mitigation device, an amount of resources being consumed; and tracking, by the DoS mitigation device, a number of connections between the client devices and the network resource. The method can further include, during a period of time in which the number of connections exceeds a connection count threshold: comparing, by the DoS mitigation device, for each client device, the amount of resources being consumed by the client device to the resource consumption threshold; and responsive to a determination that the amount of resources being consumed by a particular client device exceeds the resource consumption threshold, dropping, by the DoS mitigation device, those of the connections associated with the particular client device, whereby, during the period of time, only those connections of the connections with client devices, if any, complying with the resource consumption threshold are maintained.

In an aspect, the resource consumption threshold can represent a limit on memory resources of the network resource that may be consumed at any point in time by a client device. In another aspect, the resource consumption threshold can represent a limit on computational resources of the network resource that may be consumed at any point in time by a client device.

In an aspect, the present disclosure relates to a system having a network connection characteristic based threshold establishment module that can be configured to establish, within a DoS mitigation device that is logically interposed between a protected network resource within a private network and multiple client devices residing external to the private network, a current threshold for a network connection characteristic. The system can further include a connection volume tracking module configured to track, by the DoS mitigation device, number of connections between the client devices and the network resource. The system can further include a network connection characteristic value based comparison module configured to, during a period of time in which the number of connections exceeds a connection count threshold, compare, by the DoS mitigation device, for each connection, a measured value for the network connection characteristic to the current threshold. The system can further include a connection drop module configured to, responsive to a determination that the measured value exceeds the current threshold, drop, by the DoS mitigation device, the connection; and a current threshold reduction module configured to periodically reduce, by the DoS mitigation device, the current threshold by a predetermined amount, whereby, during the period of time, only those connections, if any, complying with the current threshold are maintained.

In another aspect, the present disclosure further relates to a system having a resource consumption based threshold establishment module configured to establish, within a DoS mitigation device that is logically interposed between a protected network resource of a private network and multiple client devices residing external to the private network, a resource consumption threshold. The system can further include a client device based resource consumption tracking module configured to track, for each client device, by the DoS mitigation device, an amount of resources being consumed; and a connection volume tracking module configured to track, by the DoS mitigation device, a number of connections between the client devices and the network resource. The system can further include a resource consumption based comparison module configured to, during a period of time in which the number of connections exceeds a connection count threshold, compare, by the DoS mitigation device, for each client device, the amount of resources being consumed by the client device to the resource consumption threshold; and a connection drop module configured to, responsive to a determination that the amount of resources being consumed by a particular client device exceeds the resource consumption threshold, drop, by the DoS mitigation device, those of the connections associated with the particular client device, whereby, during the period of time, only those connections with client devices, if any, complying with the resource consumption threshold are maintained.

The present disclosure further relates to a DoS mitigation device that can be logically interposed between a protected network resource of a private network and multiple client devices residing external to the private network, wherein the DoS mitigation device can include a network connection characteristic based threshold establishment module configured to establish a current threshold for a network connection characteristic; a connection volume tracking module configured to track number of connections between the client devices and the network resource; a network connection characteristic value based comparison module configured to, during a period of time in which the number of connections exceeds a connection count threshold, compare, for each connection, a measured value for the network connection characteristic to the current threshold; a connection drop module configured to, responsive to a determination that the measured value exceeds the current threshold, drop the connection; and a current threshold reduction module configured to periodically reduce the current threshold by a predetermined amount, whereby, during the period of time, only those connections, if any, complying with the current threshold are maintained.

The present disclosure further relates to a DoS mitigation device that can be logically interposed between a protected network resource of a private network work and multiple client devices residing external to the private network, wherein the DoS mitigation device can include a resource consumption based threshold establishment module configured to establish a resource consumption threshold; a client device based resource consumption tracking module configured to track, for each client device, an amount of resources being consumed; a connection volume tracking module configured to track a number of connections between the client devices and the network resource; a resource consumption based comparison module configured to, during a period of time in which the number of connections exceeds a connection count threshold, compare, for each client device, the amount of resources being consumed by the client device to the resource consumption threshold; and a connection drop module configured to, responsive to a determination that the amount of resources being consumed by a particular client device exceeds the resource consumption threshold, drop those of the connections associated with the particular client device, whereby, during the period of time, only those connections with client devices, if any, complying with the resource consumption threshold are maintained.

It should be appreciated that although embodiments of the present disclosure have been described with reference to DoS mitigation, one may appreciate, that the systems and methods of the present disclosure can also be used for DDoS mitigation. One may also appreciate that functionalities as explained for DoS mitigation device/system can be configured for a DDoS mitigation device/system, and vice versa, functionalities explained for DDoS mitigation device/system can be configured for a DoS mitigation device/system.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The term "connection" generally refers to a TCP connection that is in-process, pending or active during any phase/stage, including, but not limited to during the 3-way handshake that establishes a TCP connection, during data transfer and/or prior to the conclusion of the formal 4-way TCP connection termination process.

If the specification states a component or feature "may", "can", "could", or "might" be included or have a characteristic, that particular component or feature is not required to be included or have the characteristic.

FIG. 1 illustrates an exemplary representation 100 showing a DDoS network attack on a target server 110. As shown in FIG. 1, a network device/resource such as a target server 110 can be open for receiving requests and responding to such requests received from one or more client devices, which may include some legitimate client devices 104a-d and some malicious clients 102a-c. Target server 110 is an example of a network resource that may be subject of a DDoS attack. Target server 110 may be an application server, a web server, a database server, an email server or the like operating within a private network (e.g., an enterprise network or service provider network). Other non-limiting examples of network resources include forms of data, information and other hardware devices (e.g., printers, fax machines and scanners).

Client devices 102/104 can connect to target server 110 through a network such as through a network of an Internet Server Provider (ISP) 108a or a network of ISP 108b. Malicious clients 102a-c can connect to the target server 110 from different places. Sometimes malicious clients such as 102a can affect other client devices and can use such devices to attack the target server 110. These affected client devices are also referred to herein as malicious clients such as 106a-c. When a target server 110, used here to represent an exemplary network resource that needs to protected, receives requests from multiple clients, its resources may become exhausted and hence target server 110 may not be able to serve additional client requests; hence all subsequent requests directed to target server 110 may be dropped, denied, restricted or blocked. By flooding target server 110 with an overwhelming number of connections or service requests, malicious clients 102a-c or malicious clients 106a-c attempt to consume most the resources of target server 110, and hence precluded legitimate clients 104a-d from having their requests processed by target server 110. To prevent such a scenario, which is also commonly referred to as DDoS attack, a DDoS mitigation device or DDoS mitigation system can be configured to protect target server 110 by logically interposing the DDoS mitigation device between target server 110 and the external clients.

Figure 2:
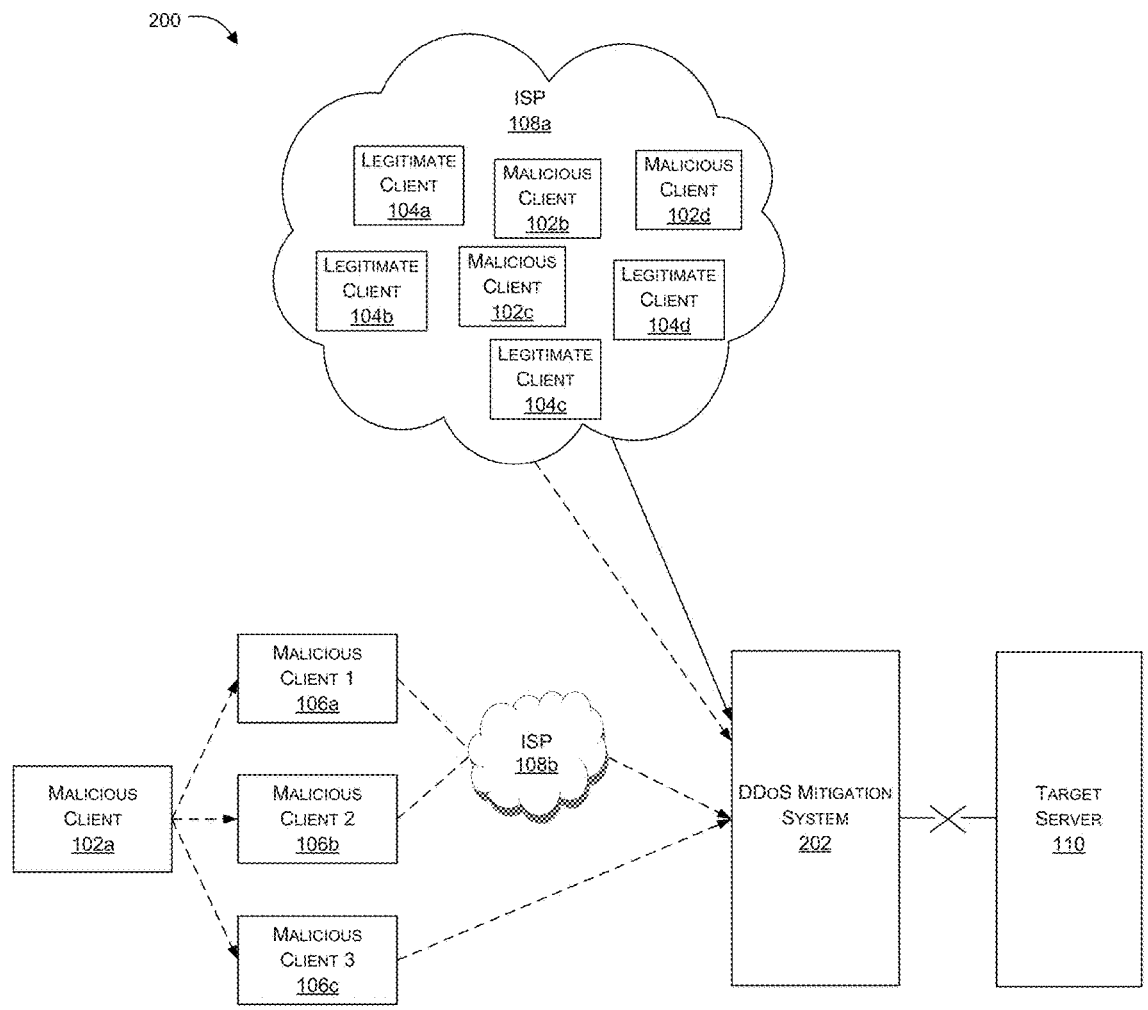
FIG. 2 illustrates an exemplary network architecture having a DDoS mitigation system logically interposed between client devices and the protected server in accordance with an embodiment of the present invention.

FIG. 2 illustrates an exemplary network architecture 200 having a DDoS mitigation system 220 logically interposed between client devices and a protected network resource 110 in accordance with an embodiment of the present invention. As shown in FIG. 2, DDoS mitigation system 202 can be placed between multiple client devices 102/104/106 and a network resource such as a target server 110 to mitigate the DDoS attack. The client devices, for example, may include malicious clients 102a-c, legitimate clients 104a-d, and malicious clients 106a-c. In contrast with a typical DDoS prevention and mitigation system that blocks access to the target server 110 for all client devices including malicious clients 102a-c, malicious clients 106a-c, as well as legitimate clients 104a-d when the number of active connections between the client devices and target server 110 exceeds a connection count threshold, in one embodiment, DDoS mitigation system 202 can be configured to allow some client devices to continue to establish connections while blocking other client devices (or even terminate other connections), thereby maintaining the ability on the part of legitimate clients 104a-d to access target server 110 based on connection characteristics, resource consumption, and/or traffic behavior of the client devices.

In an exemplary implementation, DDoS mitigation system 202 can be configured to analyse behavior of traffic originating from the client devices, and restrict traffic of those client devices that behave outside of acceptable thresholds in terms of taking an excessive amount of time and/or consumption of system resources, for example. In an aspect, DDoS mitigation system 202 (which may also be interchangeably referred to as DDoS mitigation device 202 hereinafter) may establish a current threshold for one or more network connection characteristics, examples of which are discussed below, and may also track the number of connections between the client devices and the network resource such that when the number of connections exceeds a connection count threshold, the DoS mitigation device can, for each connection (between a client device and the network resource), compare a measured value for a particular network connection characteristic to the corresponding current threshold. When the output of the comparison reveals that the measured value of the network connection characteristic exceeds the current threshold, the DoS mitigation device can drop the connection. The DoS mitigation device can further be configured to periodically reduce the current threshold by a predetermined amount, whereby, during the period of time (during which the number of connections exceeds the connection count threshold), only those connections, if any, complying with the current threshold are maintained.

One non-limiting example of a network connection characteristic that may be used in various embodiments of the present invention is the time period between transmission, by DDoS mitigation device 202, of a TCP SYN packet and receipt, by DDoS mitigation device 202, of a TCP ACK packet corresponding to the TCP SYN/ACK packet. For instance, assuming the current threshold for this network connection characteristic (time period between transmission of SYN packet and receipt of a corresponding ACK packet) has been defined as 20 ns, and one or more particular client-network resource connections are exceeding the current threshold by, for example, taking 30 ns or more between transmission of a TCP SYN packet and receipt of a corresponding TCP ACK, the DDoS mitigation device 202 can drop these connections and maintain only those of the active connections that comply with the current threshold for this network connection characteristic. The DDoS mitigation device 202 can also periodically reduce the threshold by a predetermined unit of time (e.g., 2 ns)—first to 18 ns and subsequently to 16 ns and so on until such time as the number of connections between the client devices and the network resource is below the connection count threshold.

Another non-limiting example of a network connection characteristic that may be used in various embodiments of the present invention is the time period between transmission, by DDoS mitigation device 202, of TCP SYN/ACK packet for a connection and receipt, by DDoS mitigation device 202, of a first data packet for the connection. For instance, assuming the current threshold for this network connection characteristic (time period between transmission) has been defined as 30 ns, and a particular client-network connection is exceeding the current threshold by, for example, taking 40 ns or more between transmission of the TCP SYN/ACK packet and receipt of the first data packet, DDoS mitigation device 202 can drop the connection and maintain only such connections that comply with the current threshold for this network connection characteristic. As above, DDoS mitigation device 202 can also periodically reduce the threshold, by a predetermined unit of time (e.g., 2 ns or other appropriate decrements)—first to 28 ns and subsequently to 26 ns and so on, until such time as the number of connections between the client devices and the network resource is below the connection count threshold.

Assuming DDoS mitigation device 220 has application knowledge as a result of being associated with an ADC, for example, yet another non-limiting example of a network connection characteristic that may be used in various embodiments of the present invention is the rate of HTTP headers observed by DDoS mitigation device 202 within one or more HTTP requests as a typical ADC can parse and understand the HTTP protocol, so it can easily monitor various characteristics associated with the HTTP protocol. For instance, assuming the current threshold for this network connection characteristic (rate of HTTP headers received) is, for instance, 32,000 headers per second, and one or more particular client-network resource connections are issuing more than the defined current threshold (say, 35,000 headers per second), such client-network resource connections can be dropped by DDoS mitigation device 202. As above, DDoS mitigation device 202 can also periodically reduce the threshold, by a predetermined number of headers per second (e.g., 1,000 headers per second or other appropriate decrements)—first to 31,000 headers per second and subsequently to 30,000 headers per second and so on, until such time as the number of connections between the client devices and the network resource is below the connection count threshold.

Assuming again DDoS mitigation device 220 has application knowledge as a result of being associated with an ADC, for example, yet another non-limiting example of a network connection characteristic that may be used in various embodiments of the present invention is the rate of HTTP POST body data observed by the DDoS mitigation device within one or more HTTP requests. For instance, assuming the current threshold for this network connection characteristic (rate of HTTP POST body data) is, for instance, 45,000 bytes per second, and one or more particular client-network resource connections are posting body data at a rate greater than the defined current threshold (say, 50,000 bytes per second), such client-network resource connections can be dropped by DDoS mitigation device 202. As above, DDoS mitigation device 202 can also periodically reduce the threshold, by a predetermined number of bytes per second (e.g., 2,500 bytes per second or other appropriate decrements)—first to 42,500 bytes per second and subsequently to 40,000 bytes per second and so on, until such time as the number of connections between the client devices and the network resource is below the connection count threshold.

Assuming again DDoS mitigation device 220 has application knowledge as a result of being associated with an ADC, for example, yet another non-limiting example of a network connection characteristic that may be used in various embodiments of the present invention is the rate of HTTP GET data observed by the DDoS mitigation device within one or more HTTP GET requests. For instance, assuming the current threshold for this network connection characteristic (rate of HTTP GET data) is, for instance, 65,000 bytes per second, and one or more particular client-network resource connections are requesting data at more than the defined current threshold (say 70,000 bytes per second), such client-network resource connections can be dropped by DDoS mitigation device 202. As above, DDoS mitigation device 202 can also periodically reduce the threshold, by a predetermined number of bytes per second (e.g., 3,000 bytes per second or other appropriate decrements)—first to 62,000 bytes per second and subsequently to 59,000 bytes per second and so on, until such time as the number of connections between the client devices and the network resource is below the connection count threshold.

In an aspect, DoS mitigation device 202 can be an integrated DoS mitigation module within an ADC. In another aspect, the DoS mitigation device 202 can include a standalone DoS mitigation device 202, wherein, responsive to the determination that the measured network connection characteristic exceeds the corresponding current threshold, the standalone DoS mitigation device can transmit a TCP RST packet to the network resource/server at issue (e.g., target server 110).

In an exemplary implementation, although various of the above embodiments have been explained with reference to a DoS mitigation device comparing observed network connection characteristics of each client-network resource connection with corresponding current thresholds for the network connection characteristics after the number of connections exceeds a connection count threshold, such comparisons may alternatively or additionally be performed before such connection count threshold is exceeded.

In another exemplary implementation, multiple network connection characteristics can also be combined together and/or weighted to make a determination of which connections are to be dropped. For instance, the time period between transmission of a TCP SYN packet and receipt of a corresponding TCP ACK packet as a network connection characteristic can be combined with the rate of observed HTTP GET data to determine which connections are to be dropped. In certain other embodiment, it may also not be required to periodically reduce current threshold(s) for one or more network connection characteristics.

Furthermore, although various of the above embodiments have been explained with reference to DoS mitigation device 202 comparing observed network connection characteristics of each client-network resource connection with corresponding current thresholds after the number of connections exceeds a connection count threshold, in another implementation, instead of using the number of connections, a total traffic volume may be used alternatively or in addition to trigger network connections characteristic based assessment in order to identify one or more connections to be dropped. Therefore, network connection characteristic based comparisons with corresponding current thresholds may be initiated when the number of connections exceeds a predetermined and/or configurable connection count threshold and/or network connection characteristic based comparisons with corresponding current thresholds may be initiated when the total observed traffic volume exceeds a predetermined and/or configurable traffic volume threshold (e.g., X MB/second).

In another exemplary implementation, DoS mitigation device 202 may further be configured to establish a resource consumption threshold, and track, for each client device of the multiple client devices, an amount of resources being consumed by their respective connections with target server 100. The amount of resources being consumed by a client device can be represented in various manners, including but not limited to as a percentage of processor cycles or memory of target network resource/server 110 consumed by the client device.

In an aspect, DoS mitigation device 202 can further be configured to track the number of connections between the client devices and target server 110, and during a period of time in which the number of connections exceeds a connection count threshold, compare, for each client device, the amount of resources being consumed by the client device with a predetermined and/or configurable resource consumption threshold. Responsive to a determination that the amount of resources being consumed by one or more particular client devices exceeds the resource consumption threshold, DoS mitigation device 202 can drop those of the connections associated with the client device found to be misbehaving, whereby, during the period of time, only those connections with client devices, if any, of the multiple client devices complying with the resource consumption threshold are maintained.

In an aspect, the resource consumption threshold represents a limit on memory resources of the network resource (e.g., target server 110) that may be consumed at any point in time by a client device. In an aspect, when the resource consumption threshold defined by the resource consumption threshold indicates, a maximum of X % of the memory resources of target server 110 may be consumed by any particular client device in the aggregate or a maximum of Y % of the memory resources of target server 100 may be consumed by any particular connection, any client device or connection exceeding the defined thresholds can be dropped once the number of connections exceeds the connection count threshold.

Figure 3:
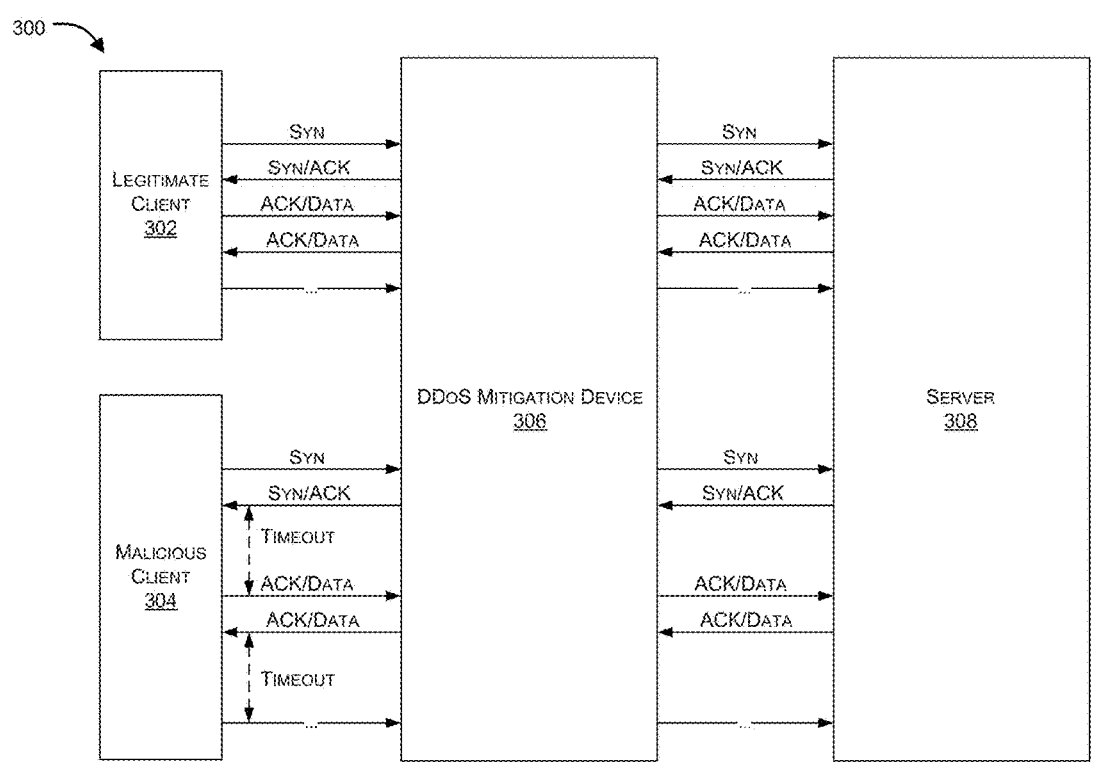
FIG. 3 illustrates exemplary behavior of a legitimate client as compared to that of a malicious client based on which a threshold for a connection characteristic can be determined in accordance with an embodiment of the present invention.

FIG. 3 illustrates exemplary behavior of a legitimate client as compared to that of a malicious client based on which a threshold for a connection characteristic can be determined in accordance with an embodiment of the present invention. Typical clients have established connection patterns:

1. A connection is established
2. The client sends/requests data to/from the server
3. The server reads/provides data from/to the client
4. The server responds to the client
5. If there is more data to send/request, continue with step 2
6. The client (or the server) closes the connection
7. The other side (the client or the server) closes the connection Many application-based DDoS attacks exploit these patterns by causing one of the above-listed steps to take an excessive amount of time, thus consuming system resources and keeping the connection active for a long time. In accordance with embodiments of the present invention clients that are not found to be exploiting the connection pattern—that is, not intentionally creating delays between the above-listed steps, then such clients are likely legitimate clients. Therefore, rather than blocking all traffic at the time of an attack, a DDoS mitigation device (e.g., DDoS mitigation device 306) may instead start shrinking the timeouts associated with one or more of the above-listed steps. By doing so, most legitimate clients will still be able to access the protected network resource (e.g., server 308) and continue their connections; however, malicious clients will be blocked, as well as a small percentage of well-meaning legitimate clients on slow connections.

As shown in FIG. 3, DDoS mitigation device 306 can be configured to monitor behavior of client devices including a legitimate client 302 and a malicious client 304. DDoS mitigation device 306 can observe, over a period of time, different network connection characteristics, for example, an average time taken by legitimate client 302 at each step of the connection pattern and define a threshold for each of multiple network connection characteristics accordingly. For example, DDoS mitigation device 306 may observe that the average time taken by legitimate client 302 to send a TCP data packet after receiving a TCP ACK is X microseconds, which is generally shorter than average time taken by malicious client 304 to send a TCP data packet after receiving a TCP ACK. DDoS mitigation device 306 can observe that malicious client 304 is deliberately delaying response. Similarly, at one or more other steps during the communication session, malicious client may introduce additional delays.

Based on its observations, DDoS mitigation device 306 can similarly define a threshold for the time period between transmission of a TCP SYN/ACK packet and receipt of a TCP ACK packet corresponding to the TCP SYN/ACK packet by the DDoS mitigation system, another threshold for the time period between transmission of a TCP SYN/ACK packet for a connection and receipt of a first data packet for the connection by the DDoS mitigation device, another threshold for the rate of HTTP headers observed, another threshold for rate of HTTP POST body data observed, another threshold for the rate of HTTP POST body data observed, and another threshold for the rate of HTTP GET data observed respectively by the DDoS mitigation system. In an exemplary implementation, for each network connection characteristic, a corresponding threshold can be determined by the DDoS mitigation device 306 based on its observations. Alternatively or additionally, one or more initial thresholds my be configured by a network administrator.

In an aspect, device 306 can be configured to use any or a combination of multiple network connection characteristics. In an exemplary implementation, device 306 can be configured to, for each connection between the client device and server 308, measure a value of a particular network connection characteristic and compare the measured value with the respective threshold value of the particular network connection characteristic, wherein if the value of the particular network connection characteristic for a particular connection deviates from the threshold, for example, exceeds the threshold, device 306 can terminate or drop the particular connection.

In an exemplary implementation, thresholds of network connection characteristics can be established based on application knowledge by device 306. For example, if device 306 has application knowledge, such as when DDoS mitigation device 306 is integrated with an ADC, it can parse and understand the HTTP protocol and can easily monitor the rate of HTTP headers, HTTP POST body data and/or HTTP GET data.

For example, DDoS mitigation device 306 can be configured to restrict communications for which time taken by the client device to respond after receiving a TCP ACK packet is greater than X ms. In an exemplary implementation, instead of blocking connections to server 308 for all client devices, DDoS mitigation device 306 can block only those connections that are taking longer than X ms to respond to the TCP ACK packet or are taking longer time to send a TCP data packet.

In an exemplary implementation, DDoS mitigation device 306 can be configured to dynamically adjust (tighten) one or more of the thresholds for each network connection characteristic. The DDoS mitigation device 306, instead of blocking all traffic at the time of an attack, can start shrinking the threshold of the network connection characteristic, for example, by reducing the time of timeouts associated with each step of the connection pattern described above. By doing so, legitimate clients 302 may still be able to access server 308 and continue their connections, whereas malicious client(s) 304 are blocked.

Figure 4:
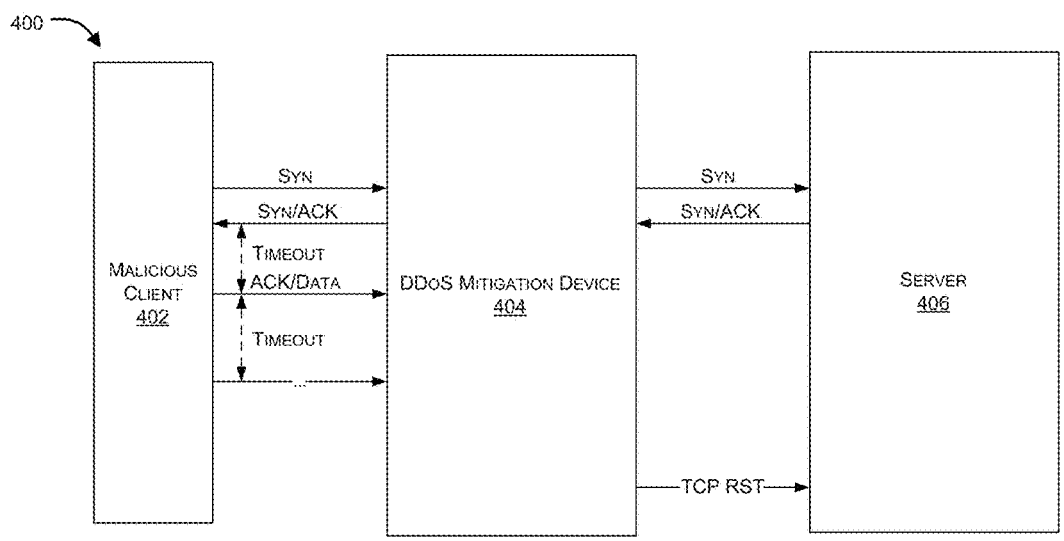
FIG. 4 illustrates an exemplary DDoS mitigation device configured to detect behavior of an attacker and prevent the attacker from impacting a protected server in accordance with an embodiment of present invention.

FIG. 4 illustrates an exemplary DDoS mitigation device 404 configured to detect behavior of a malicious client 402 used by an attacker and prevent the attacker from impacting a protected server 406 in accordance with an embodiment of present invention.

In an implementation, DDoS mitigation device 404, after detecting that the number of connections between client devices and server 406 have exceeded a predetermined or configurable static connection count threshold, can enter into a mitigation mode. In an exemplary implementation, DDoS mitigation device 404, while in the mitigation mode, can compare values of one or more network connection characteristics (e.g., reply time, turnaround time, rate of HTTP headers, among other like characteristics) for each connection, and drop connections for which the value for the network connection characteristic exceeds a corresponding currently defined threshold.

At the beginning of a connection pattern, the timeout threshold may be large enough to allow a malicious client that is intentionally introducing delays into any stage of the connection pattern (e.g., sending slow data to server 406) to be processed as a well-behaved client. As can be seen in the exemplary interactions illustrated by FIG. 4, however, as the traffic increases and DDoS mitigation device 404 shrinks the timeout associated with the monitored characteristic (e.g., the threshold for receiving a TCP ACK or a TCP data packet responsive to a TCP SYN/ACK), DDoS mitigation device 404 will ultimately drop the connection associated with the misbehaving client. As shown in FIG. 4, because DDoS mitigation device 404 is taking an active role in proxying the connection, it can notify server 406 that the connection has been dropped by sending a TCP RST to server 406, thereby allowing server 406 to free resources associated with the dropped connection. In this manner, DDoS mitigation device 404 protects server 406 from potential resource exhaustion by allowing server 406 to free up resources sooner than it otherwise would.

Figure 5A:
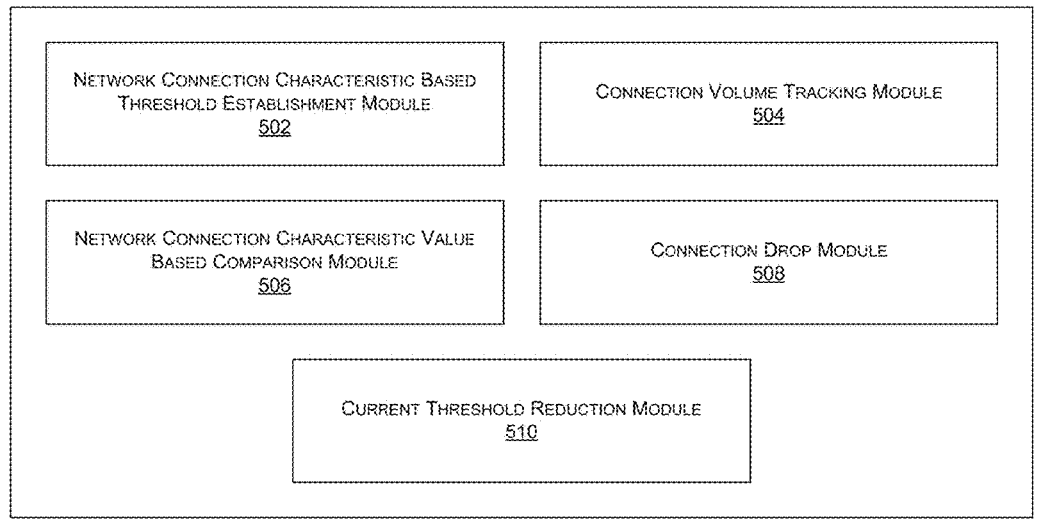
FIGS. 5A and 5B illustrate exemplary functional units of a DDoS mitigation system in accordance with various embodiments of the present invention.

FIG. 5A illustrates exemplary functional units of a DDoS mitigation system 500 in accordance with an embodiment of the present invention. Embodiments of the present disclosure provide a DDoS mitigation system that enables access of a network resource by legitimate clients and blocks access of protected resources by non-legitimate/malicious clients based on dynamically adjustable threshold of one or a combination of network connection characteristic(s).

In an embodiment, DDoS mitigation system 500 can be configured to mitigate a DDoS attack based on a dynamically adjustable thresholds associated with one or more network connection characteristics. In another embodiment, the DDoS mitigation system can be configured to mitigate DDoS attack based on utilization of one or more resources (e.g., processor and/or memory resources) of the protected network resource.

In an aspect, system 500 can include a network connection characteristic based threshold establishment module 502 configured to establish, within a DoS mitigation device that is logically interposed between a protected network resource of a private network and multiple client devices residing external to the private network, a current threshold for a network connection characteristic. System 500 can further include a connection volume tracking module 504 configured to track, by the DoS mitigation device, the number of connections between the client devices and the network resource. System 500 can further include a network connection characteristic value based comparison module 506 configured to, during a period of time in which the number of connections exceeds a connection count threshold, compare, by the DoS mitigation device, for each connection, a measured value for the network connection characteristic to the current threshold. System 500 can further include a connection drop module 508 configured to, responsive to a determination that the measured value exceeds the current threshold, drop, by the DoS mitigation device, the connection. System 500 can further include a current threshold reduction module 510 configured to periodically reduce, by the DoS mitigation device, the current threshold by a predetermined amount, whereby, during the period of time, only those connections, if any, complying with the current threshold are maintained.

In an exemplary implementation, module 502 can be configured to establish a threshold for a network connection characteristic. Module 502 can also be configured to establish different thresholds for each of multiple network connection characteristics. Module 502 can also establish/estimate different thresholds for each characteristic of the connection characteristics, wherein the threshold for a given network connection characteristic can be established based on observation of the traffic behavior by system 500 over a period of time. In another exemplary embodiment, threshold for a given network connection characteristic can be established based on protocol information associated with the application with which the connection is associated (in case the system is application aware). For example if system 500 is implemented within a connection aware network device (e.g., an ADC), thresholds for various network connection characteristics can be determined based on the protocol standard.

Non-limiting examples of potential network connection characteristics include (i) the time period between transmission of a TCP SYN/ACK packet and receipt of a TCP ACK packet corresponding to the TCP SYN/ACK packet by the DDoS mitigation system; (ii) the time period between transmission of a TCP SYN/ACK packet for a connection and receipt of a first data packet for the connection by the DDoS mitigation system; (iii) the rate of HTTP headers observed by the DDoS mitigation system on a particular connection; (iv) the rate of HTTP POST body data observed by the DDoS mitigation system on a particular connection; and (v) the rate of HTTP GET data observed on a particular connection by the DDoS mitigation system. System 500 can be configured to use any or a combination of the network connection characteristics described above. In an embodiment, there can be different thresholds for each network connection characteristic. Depending upon the particular implementation, the thresholds may be the same or different depending upon the particular client device.

In an aspect, connection volume tracking module 504 can be configured to track a number of connections between the client devices and the network resource, and activate a mitigation mode on the system 500 during a time period in which the number of connections exceeds a preconfigured connection count threshold. Other modules of system 500 can start their functioning once system 500 enters the mitigation mode. For example, if the number of connections between the client devices and the network resource is more than 1,000 connections, entry into the mitigation mode can be triggered. In another implementation, instead of the number of connections triggering entry into the mitigation mode, module 554 can be configured to determine a total traffic volume, which can also be used as a static threshold parameter based upon which mitigate mode can be activated. Therefore, in one aspect, mitigation mode can be activated when the number of connections exceeds a threshold (e.g., 1,500 connections), and in another aspect, the mode can be initiated when the total traffic volume is above a threshold (e.g., 60 Mbps). In other exemplary implementations, other static thresholds can also be used for triggering the mitigation mode.

In an aspect, module 506 can be configured to, during a period of time in which the number of connections exceeds a connection count threshold (when the mitigation mode is triggered), compare, for each connection, a measured value for the network connection characteristic to the current threshold of the respective connection characteristic. Module 506 can measure value for one or more of the measured network connection characteristics, and compare the measured value(s) with respective thresholds for the characteristics that were established by the module 502. In an exemplary implementation, module 506 can be configured to measure a value of one or more network connection characteristics for each connection, and compare the measured value with the threshold value for each of the one or network connection characteristics for each of the connections.

In an aspect, module 508 can be configured to drop those of the connections for which the measured value of a particular connection characteristic exceeds the corresponding threshold value for the connection characteristic. Responsive to a determination that the measured value of a particular connection characteristic of the connections exceeds a corresponding current threshold, system 500 (through module 508, for instance) can drop the particular connection. In one embodiment, therefore, system 500 will maintain, during the period of time, only those connections, if any, that comply with the dynamically adjustable threshold.

In an exemplary implementation, module 506 can compare a measured value of one or more network connection characteristics for each connection with a corresponding dynamically adjustable threshold value, and in response to such comparison, module 508 can drop those connections for which the measured value exceeds the dynamically adjusted threshold value. In an aspect, the dynamically adjustable threshold value can initially be set at the current threshold value for one or more network connection characteristics, and can further be adjusted/reduced (on a periodic basis or responsive to an increase in traffic volume or connections) by the current threshold reduction module 510. In an exemplary implementation, module 508 may elect to drop only those connections for which the measured values of at least two or more network connection characteristics exceed their corresponding threshold values.

In an exemplary implementation, module 508 can be configured to send identity connections and/or client devices for which the connections are being dropped so as to enable the network resource/server to pull-out the resources dedicated to such client devices/connections. In an exemplary implementation, system 500 can be configured to transmit a TCP RST packet to such client devices responsive to the determination that measured value of a connection characteristic exceeds current threshold of the connection characteristic.

In an exemplary implementation, module 510 can be configured to periodically reduce threshold/current values of one or more network connection characteristics. In an exemplary implementation, module 510 can even increase threshold values of a network connection characteristic depending on configuration of the DDoS mitigation device and traffic attributes.

Figure 5B:
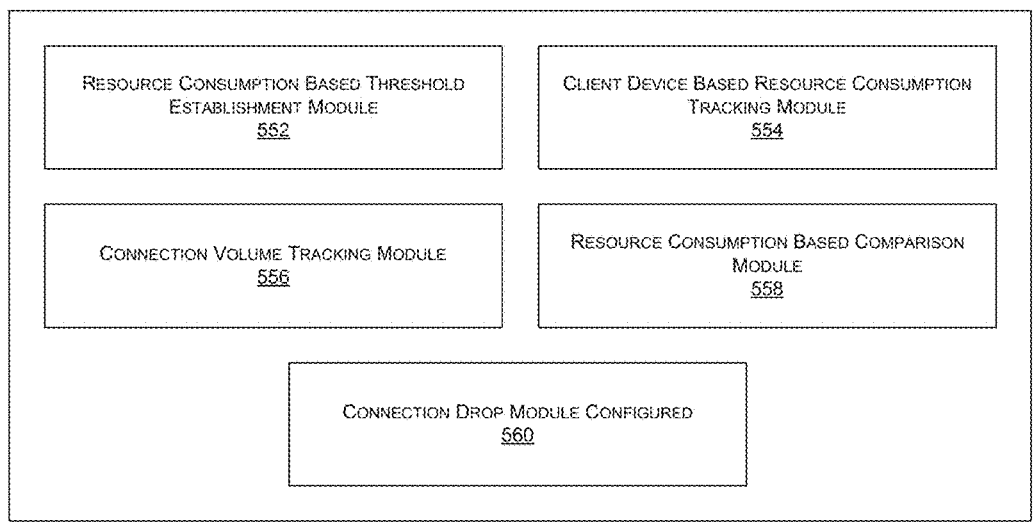

FIG. 5B illustrates exemplary functional units of a DDoS mitigation system 550 in accordance with another embodiment of the present invention. System 550 includes a resource consumption based threshold establishment module 552 configured to establish, within a DoS mitigation device that is logically interposed between a protected network resource of a private network and multiple client devices residing external to the private network, a resource consumption threshold. System 550 further includes a client device based resource consumption tracking module 554 configured to track, for each client device, by the DoS mitigation device, an amount of resources being consumed. System 550 further includes a connection volume tracking module 556 configured to track, by the DoS mitigation device, a number of connections between the client devices and the network resource. System 550 further includes a resource consumption based comparison module 558 configured to, during a period of time in which the number of connections exceeds a connection count threshold, compare, by the DoS mitigation device, for each client device, the amount of resources being consumed by the client device to the resource consumption threshold. System 550 further includes a connection drop module 560 configured to, responsive to a determination that the amount of resources being consumed by a particular client device exceeds the resource consumption threshold, drop, by the DoS mitigation device, those of the connections associated with the particular client device, whereby, during the period of time, only those connections with client devices, if any, complying with the resource consumption threshold are maintained.

In an exemplary embodiment, the resource consumption threshold can represent a limit on memory resources of the network resource that may be consumed at any point in time by a client device. The resource consumption threshold can also, in another embodiment, represent a limit on computational resources of the network resource that may be consumed at any point in time by a client device for a particular connection or in the aggregate.

In an embodiment, system 550 can be configured to drop those of the connections associated with a particular client device, for which the amount of resources being consumed by a particular client device exceeds the resource consumption threshold, whereby, during the period of time, only those connections with client devices, if any, complying with the resource consumption threshold are maintained.

In an exemplary embodiment, module 552 can be configured to establish a resource consumption threshold. The resource consumption threshold can represent a limit on memory resources of a network resource/server that may be consumed at any point in time by a client device. The resource consumption threshold can represent a limit on computational resources of the network resource that may be consumed at any point in time by a client device. The resource consumption threshold can be any or a communication of memory usage, CPU usage, bandwidth usage, or any other network usage parameter being consumed at the network resource. In an aspect, the estimated resource consumption threshold can be stored in a database coupled with system 550.

In an aspect, tracking module 554 can be configured to track, for each client device, by the DoS mitigation device, amount of resources being consumed. In an aspect, module 554 can be configured to track any or a combination of memory usage, CPU usage, or network usage at the network resource that is being consumed by each client device connection.

In an aspect, connection volume tracking module 556 can be configured to track the number of connections between the client devices and the network resource, and based thereon, activate a mitigation mode when the number of connections exceeds a preconfigured connection count threshold. Other modules of system 550 can start their respective functioning once system 550 has entered the mitigation mode. For example, if the number of connections between the client devices and the network resource is more than a threshold (e.g., 1,000 connections), the mitigation mode can be triggered. In another implementation, instead of the number of connections, module 554 can be configured to determine a total traffic volume, which can also be used as a static threshold parameter based upon which the mitigation mode can be activated. Therefore, in one aspect, mitigation mode can be activated when the number of connections exceeds a threshold (e.g., 1,500 connections), and in another aspect, the mitigation mode can be initiated when the total traffic volume is above a threshold (e.g., 60 Mbps). In other exemplary implementations, other static thresholds can also be used for triggering the mitigation mode.

The resource consumption based comparison module 558 can be configured to, during a period of time in which the number of connections exceeds a connection count threshold or when an static condition is met and the mitigation mode is triggered, compare, for each client device, the amount of resources being consumed with the resource consumption threshold. Module 558 can be configured to compare resource utilization for different resources against one or more thresholds set for such resources for each of the client device.

In an aspect, module 560 can be configured to drop such connection for which a measured value of the resource utilization exceeds a resource consumption threshold. Responsive to a determination that the amount of resources being consumed by a particular client device exceeds the resource consumption threshold, module 560 can drop those of the connections associated with the particular client device, whereby, during the period of time, only those connections with client devices, if any, complying with the resource consumption threshold are maintained.

In an exemplary implementation, system 550 can be configured to transmit a TCP RST packet to the client device and/or to the network resource responsive to the determination that the measured value of resource consumption by the client device exceeds the resource consumption threshold.

In different implementations, system 500 or system 550 can be configured in a standalone network device, also interchangeably referred to as DDoS mitigation device, or can be configured within an ADC.

In an exemplary implementation, system 550 can be configured to send the identities of connections and/or of clients for which connections are being dropped to the network resource so as to enable the network resource to release the resources dedicated to such clients.

Figure 6A:
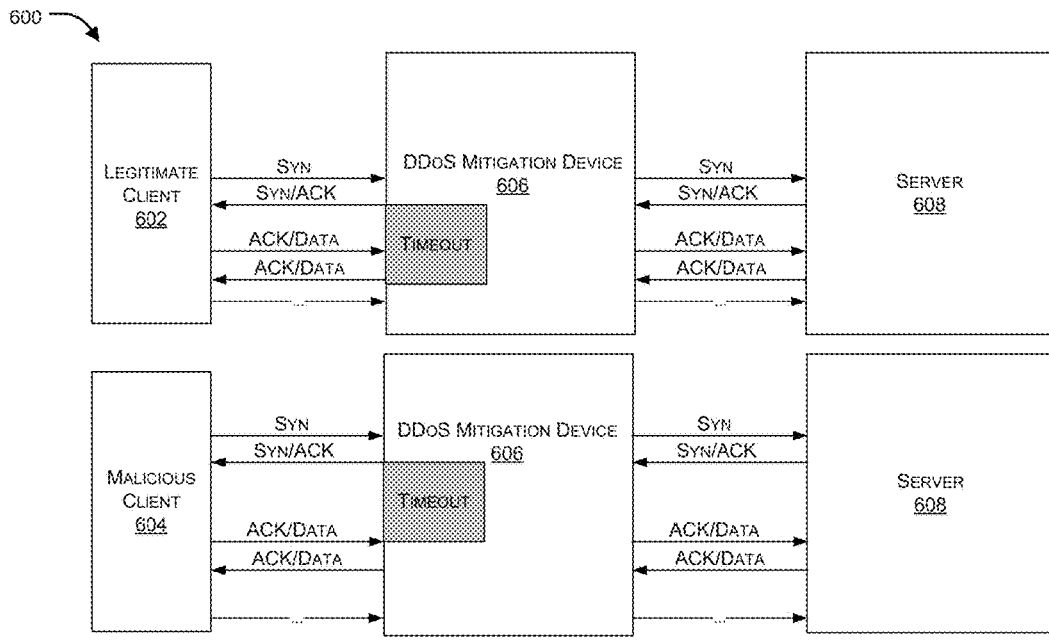
FIGS. 6A and 6B illustrate exemplary actions taken by a DDoS mitigation system based on a dynamically calculated timeout period in accordance with an embodiment of the present invention.
Figure 6B:
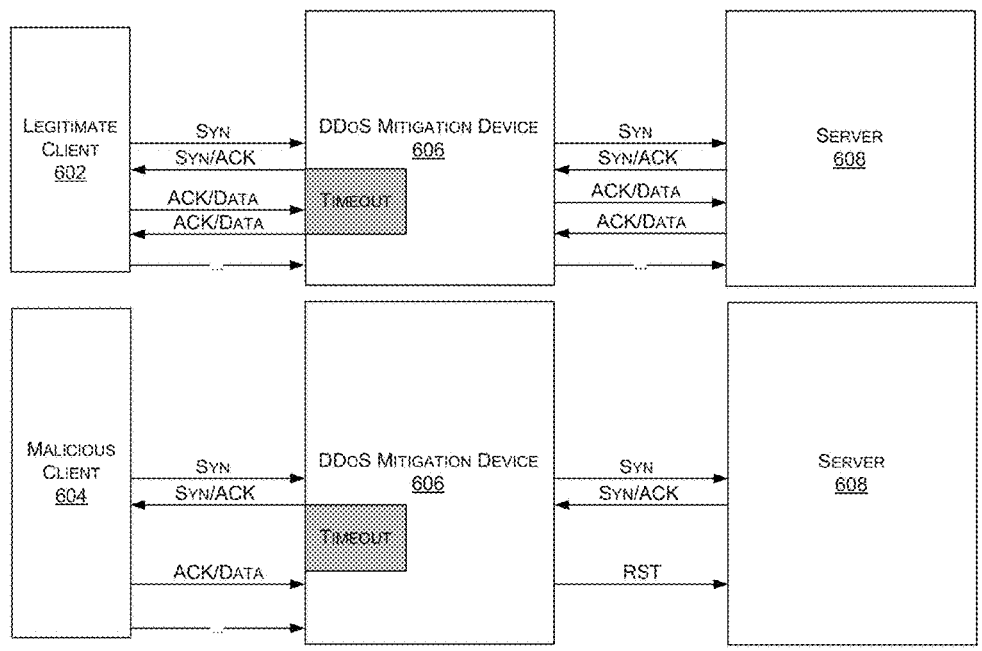

FIGS. 6A and 6B illustrate exemplary actions taken by a DDoS mitigation system based on a dynamically calculated timeout period in accordance with an embodiment of the present invention. As shown in FIG. 6A, DDoS mitigation system, for example implemented on a DDoS mitigation device 606, can define a timeout period for a particular event of a connection pattern. The particular event (e.g., the time between the transmission of a TCP SYN/ACK by DDoS mitigation device 606 to a particular client and receipt of a corresponding TCP ACK from the client) can be configured as a network connection characteristic to be monitored and evaluated with respect to an associated dynamically adjustable threshold (e.g., the shaded timeout box). In the example interactions illustrated by FIG. 6A, legitimate client 602 is interacting with server 608 (via DDoS mitigation device 606) in a well-behaved manner. That is, the TCP ACK and/or TCP Data corresponding to the TCP SYN/ACK sent by DDoS mitigation device 606 is transmitted without delay and is received well within the timeout threshold. Meanwhile, malicious client 604 is intentionally responding slowly to the TCP SYN/ACK received from DDoS mitigation device 606 with a TCP ACK or TCP data in an attempt to disrupt availability of server 608. Because the current timeout threshold associated with this network connection parameter is initially relatively large, the intentional delay introduced by malicious client 604 does not yet trigger a timeout.

Turning now and to FIG. 6B, as a result of increasing traffic volume, for example, the timeout threshold has been decreased by DDoS mitigation device 606 in an effort to prune misbehaving connections. This shrinking of the timeout threshold has two effects. First, malicious clients, such as malicious client 604, can now automatically be blocked because they are sending data slower than the new timeout threshold allows while well-behaved clients, such as legitimate client 602, are still able to access services provided by server 608. Second, because DDoS mitigation device 606 can take an active role in proxying the data, it is able to notify server 608 that the connection associated with malicious client 604 has been dropped by sending a TCP RST. In this manner, server 608 can free up resources associated with this connection much sooner than it otherwise would, avoiding possible resource exhaustion.

Figure 7A:
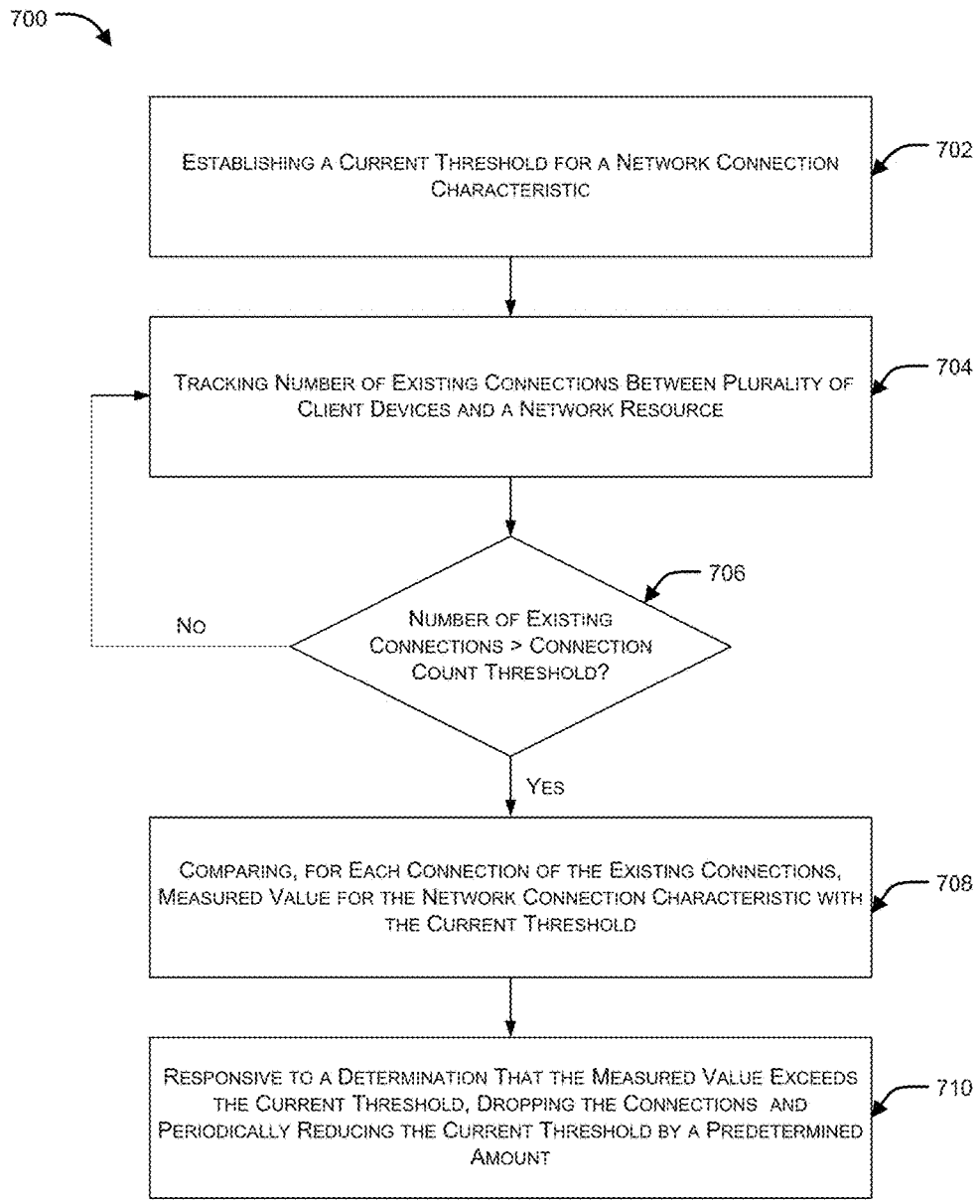
FIG. 7A is a flow diagram illustrating DDoS attack mitigation processing based on a dynamically adjustable threshold of a network connection characteristic in accordance with an embodiment of the present invention.

FIG. 7A is a flow diagram illustrating DDoS attack mitigation processing based on a dynamically adjustable threshold of a network connection characteristic in accordance with an embodiment of the present invention. In one embodiment, the DDoS attack mitigation processing can be performed by a standalone DoS mitigation device. Alternatively, the DDoS attack mitigation processing can be performed within an ADC. In an aspect, the method can include, at step 702, establishing a current threshold for a network connection characteristic, at 704, tracking a number of connections between the client devices and a network resource, and at step 706, checking if the number of connection between the client devices and the network resource is greater than a connection count threshold. The method can further, at step 708, include the step of comparing, at the DoS mitigation device, for each connection, a measured value for the network connection characteristic with the current threshold during a period of time in which the number of connections exceeds a connection count threshold, and at step 710, responsive to a determination that the measured value exceeds the current threshold, dropping the connection and periodically reducing the current threshold by a predetermined amount. In an exemplary embodiment, during the period of time, only those connections, if any, complying with the current threshold are maintained. If the number of connections is not greater than the connection count threshold, the DoS mitigation device can continue tracking the number of connection and maintain all connections between the client devices and the network resource.

In an exemplary implementation, step 706 can alternatively include checking if the individual traffic volume associated with a particular client device or aggregate traffic volume between the client devices and the network resource is greater than a traffic volume threshold, and step 708 can be executed if the individual traffic volume or the aggregate traffic volume is greater than a traffic volume threshold.

Figure 7B:
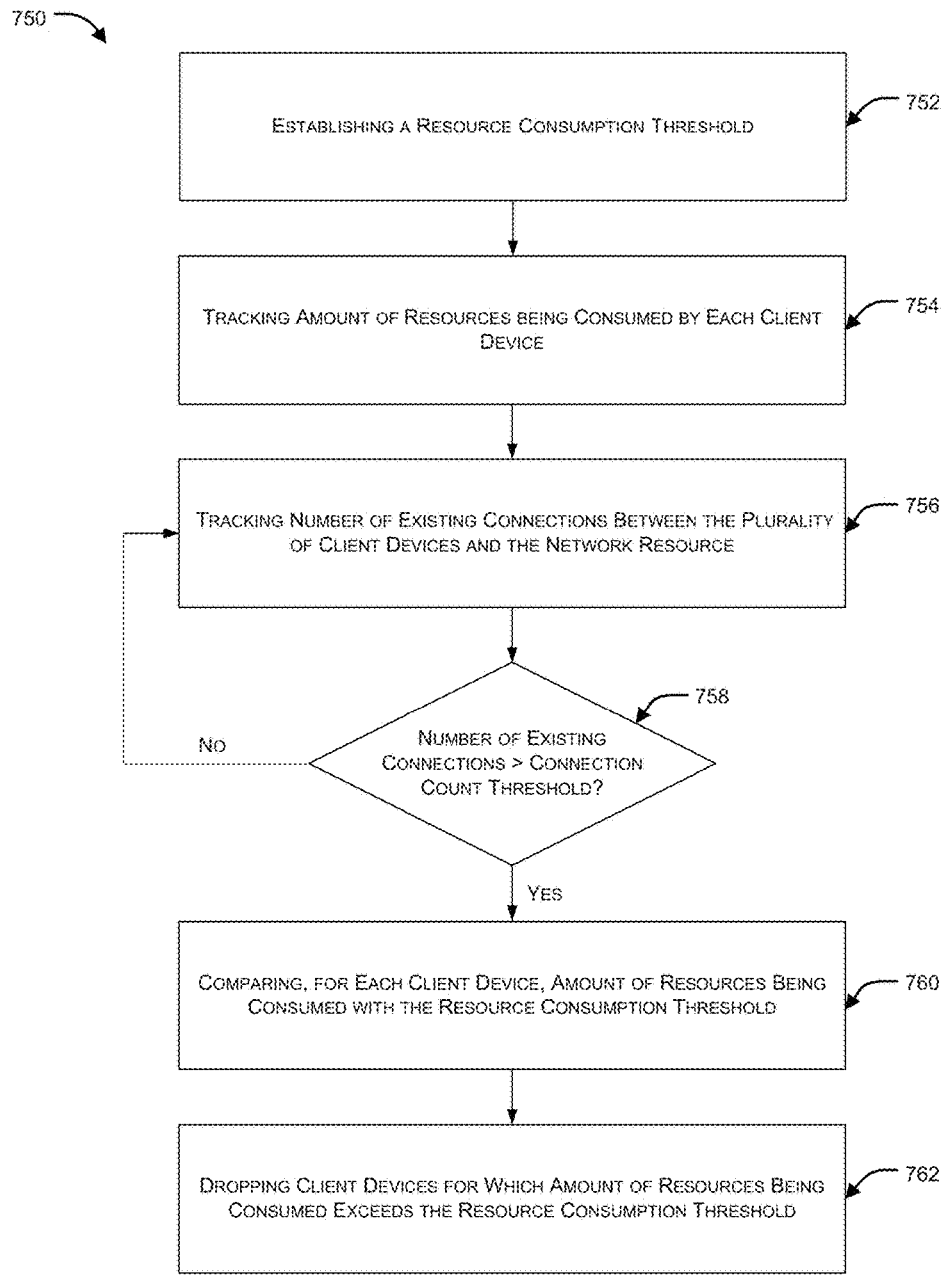
FIG. 7B is a flow diagram illustrating DDoS attack mitigation processing based on resource utilization in accordance with an embodiment of the present invention.

FIG. 7B is a flow diagram illustrating DDoS attack mitigation processing based on resource utilization in accordance with an embodiment of the present invention. In an aspect, the following method steps can be executed by a dedicated DoS mitigation device or by a DOS mitigation module integrated within an ADC. The method can include, at step 752, establishing a resource consumption threshold, at step 754, tracking, for each client device having a connection with the DDoS mitigation device/module, an amount of resources of the protected network resource being consumed, and at step 756, tracking the number of connections between the client devices and the protected network resource. At step 758, the method can include checking if the number of connection is greater than a connection count threshold, and comparing, at step 760, for each client device, an amount of resources being consumed by each client device with the resource consumption threshold during a period of time in which the number of connections exceeds a connection count threshold. The method can further include, at step 762, responsive to a determination that the amount of resources being consumed by a particular client device exceeds the resource consumption threshold, dropping those of the connections associated with the particular client device.

In an exemplary implementation, during the period of time, only those connections with client devices, if any, complying with the resource consumption threshold are maintained.

In an exemplary implementation, step 758 can alternatively include checking if individual traffic volume or aggregate traffic volume between the client devices and the network resource is greater than a traffic volume threshold, and step 760 can be executed if the individual traffic volume or the collective traffic volume between the client devices and the network resource is greater than a traffic volume threshold.

As those of ordinary skill in the art will appreciate, network resource can be any network resource, for example a server, a database, or any other computing device attached to the network. Systems and methods described above enable mitigation of DoS, wherein the DoS mitigation device does not completely drop all the connections between the client devices and the network resource, but rather makes an effort to block misbehaving clients (which are typically malicious clients) and continue to allow well-behaved, legitimate clients to access the network resource.

Figure 8:
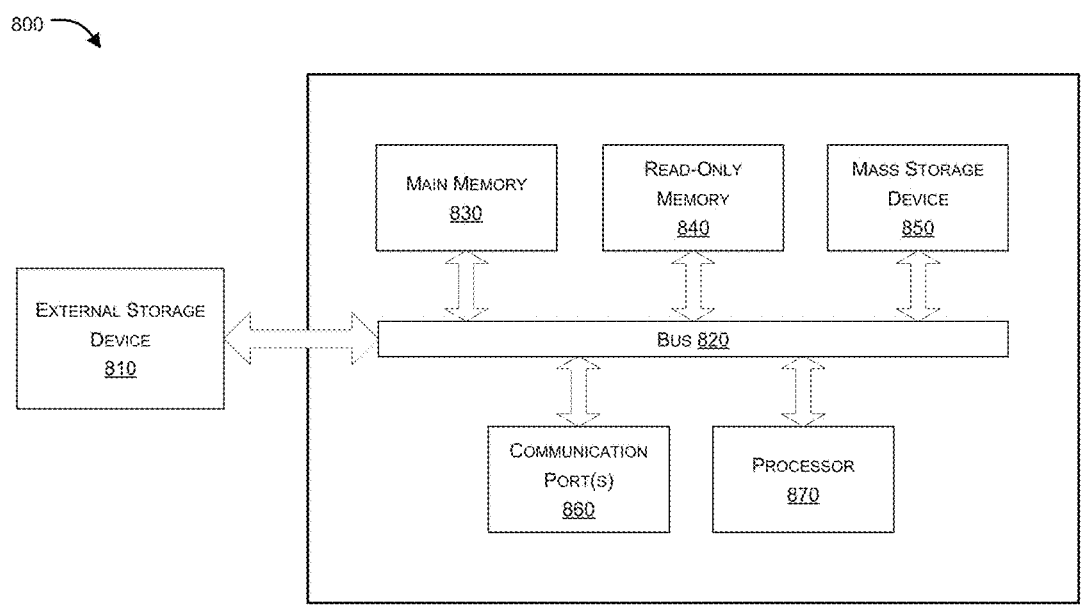
FIG. 8 is an exemplary computer system in which or with which embodiments of the present invention may be utilized.

FIG. 8 is an example of a computer system 800 with which embodiments of the present disclosure may be utilized. Computer system 800 may represent or form a part of a network security device (e.g., an ADC with a DoS mitigation module integrated therein or a standalone DoS mitigation device), a gateway or other network appliance. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As shown, computer system 800 includes a bus 830, a processor 805, communication port 810, a main memory 815, a removable storage media 840, a read only memory 820 and a mass storage 825. A person skilled in the art will appreciate that computer system 800 may include more than one processor and communication ports. Examples of processor 805 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 805 may include various modules associated with embodiments of the present invention. Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), or any network to which computer system 800 connects. Memory 815 can be Random Access Memory (RAM), or any other dynamic storage device commonly known in the art. Read only memory 820 can be any static storage device(s) such as, but not limited to, a Programmable Read Only Memory (PROM) chips for storing static information such as start-up or BIOS instructions for processor 805. Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc. Bus 830 communicatively couples processor(s) 805 with the other memory, storage and communication blocks. Bus 830 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to software system. Optionally, operator and administrative interfaces, such as a display, keyboard, and a cursor control device, may also be coupled to bus 830 to support direct operator interaction with computer system 800. Other operator and administrative interfaces can be provided through network connections connected through communication port 810. Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

The invention claimed is:

1. A method comprising:
   establishing, within a Denial-of-Service (DoS) mitigation device logically interposed between a protected resource of a private network ("protected network resource") and a plurality of client devices residing external to the private network, a current threshold for a network connection characteristic;
   tracking, by the DoS mitigation device, a number of connections between the plurality of client devices and the protected network resource; and
   during a period of time in which the number of connections exceeds a connection count threshold:
      comparing, by the DoS mitigation device, for each of the connections, a measured value for the network connection characteristic to the current threshold; and
      responsive to a determination that the measured value exceeds the current threshold, dropping, by the DoS mitigation device, the connection; and
      periodically reducing, by the DoS mitigation device, the current threshold by a predetermined amount, whereby, during the period of time, only those connections, if any, of the connections complying with the current threshold are maintained.

2. The method of claim 1, wherein the network connection characteristic comprises a time period between transmission, by the DDoS mitigation device, of a Transmission Control Protocol (TCP) SYN/ACK packet and receipt, by the DDoS mitigation device, of a TCP ACK packet corresponding to the TCP SYN/ACK packet.

3. The method of claim 1, wherein the network connection characteristic comprises a time period between transmission, by the DDoS mitigation device, of a TCP SYN/ACK packet for a connection of the connections and receipt, by the DDoS mitigation device, of a first data packet for the connection.

4. The method of claim 1, wherein the DoS mitigation device comprises a DoS mitigation module within an Application Delivery Controller (ADC).

5. The method of claim 1, wherein the network connection characteristic comprises a rate of Hypertext Transfer Protocol (HTTP) headers observed by the DDoS mitigation device within one or more HTTP requests.

6. The method of claim 1, wherein the network connection characteristic comprises a rate of HTTP POST body data observed by the DDoS mitigation device within one or more HTTP requests.

7. The method of claim 1, wherein the network connection characteristic comprises a rate of HTTP GET data observed by the DDoS mitigation device within one or more HTTP requests.

8. The method of claim 1, wherein the DoS mitigation device comprises a standalone DoS mitigation device and wherein the method further comprises responsive to said determination that the measured value exceeds the current threshold, transmitting, by the standalone DoS mitigation device, a TCP RST packet to the protected network resource.

9. A non-transitory computer-readable storage medium embodying a set of instructions, which when executed by one or more processors of a Denial-of-Service (DoS) mitigation device logically interposed between a protected resource of a private network ("protected network resource") and a plurality of client devices residing external to the private network, cause the one or more processors to perform a method comprising:
    establishing a current threshold for a network connection characteristic;
    tracking a number of connections between the plurality of client devices and the protected network resource; and
    during a period of time in which the number of connections exceeds a connection count threshold:
        comparing, for each of the connections, a measured value for the network connection characteristic to the current threshold; and
        responsive to a determination that the measured value exceeds the current threshold, causing the connection to be dropped; and
        periodically reducing the current threshold by a predetermined amount, whereby, during the period of time, only those connections, if any, of the connections complying with the current threshold are maintained.

10. The non-transitory computer-readable storage medium of claim 9, wherein the network connection characteristic comprises a time period between transmission, by the DDoS mitigation device, of a Transmission Control Protocol (TCP) SYN/ACK packet and receipt, by the DDoS mitigation device, of a TCP ACK packet corresponding to the TCP SYN/ACK packet.

11. The non-transitory computer-readable storage medium of claim 9, wherein the network connection characteristic comprises a time period between transmission, by the DDoS mitigation device, of a TCP SYN/ACK packet for a connection of the connections and receipt, by the DDoS mitigation device, of a first data packet for the connection.

12. The non-transitory computer-readable storage medium of claim 9, wherein the DoS mitigation device comprises a DoS mitigation module within an Application Delivery Controller (ADC).

13. The non-transitory computer-readable storage medium of claim 9, wherein the network connection characteristic comprises a rate of Hypertext Transfer Protocol (HTTP) headers observed by the DDoS mitigation device within one or more HTTP requests.

14. The non-transitory computer-readable storage medium of claim 9, wherein the network connection characteristic comprises a rate of HTTP POST body data observed by the DDoS mitigation device within one or more HTTP requests.

15. The non-transitory computer-readable storage medium of claim 9, wherein the network connection characteristic comprises a rate of HTTP GET data observed by the DDoS mitigation device within one or more HTTP requests.

16. The non-transitory computer-readable storage medium of claim 9, wherein the DoS mitigation device comprises a standalone DoS mitigation device and wherein the method further comprises responsive to said determination that the measured value exceeds the current threshold, transmitting a TCP RST packet to the protected network resource.

* * * * *